United States Patent
Fremerman et al.

(10) Patent No.: US 10,625,614 B2
(45) Date of Patent: Apr. 21, 2020

(54) SYSTEM AND METHOD FOR MANAGING CHARGING PARAMETERS BETWEEN A VEHICLE AND A CHARGING STATION

(71) Applicant: GM Global Technology Operations LLC, Detroit, MI (US)

(72) Inventors: Jonathan S. Fremerman, Royal Oak, MI (US); Nicholas J. Hainer, Walled Lake, MI (US); Michael A. Assenmacher, Highland, MI (US); Jonathan J. Stec, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 351 days.

(21) Appl. No.: 15/628,207

(22) Filed: Jun. 20, 2017

(65) Prior Publication Data
US 2018/0361864 A1    Dec. 20, 2018

(51) Int. Cl.
| | |
|---|---|
| *B60L 53/63* | (2019.01) |
| *B60L 53/60* | (2019.01) |
| *B60L 11/18* | (2006.01) |
| *G06Q 10/06* | (2012.01) |
| *G06Q 50/06* | (2012.01) |
| *B60L 58/12* | (2019.01) |
| *B60L 53/62* | (2019.01) |
| *B60L 53/64* | (2019.01) |
| *B60L 53/66* | (2019.01) |

(Continued)

(52) U.S. Cl.
CPC .......... *B60L 11/1838* (2013.01); *B60L 53/60* (2019.02); *B60L 53/62* (2019.02); *B60L 53/63* (2019.02); *B60L 53/64* (2019.02); *B60L 53/66* (2019.02); *B60L 58/12* (2019.02); *G06Q 10/0631* (2013.01); *G06Q 50/06* (2013.01); *H02J 7/00036* (2020.01); *H02J 13/00007* (2020.01)

(58) Field of Classification Search
CPC .... B60L 11/1809–185; B60L 53/14–18; B60L 53/305; B60L 53/60; B60L 53/66
USPC ........................................................ 320/109
See application file for complete search history.

(56) References Cited

U.S. PATENT DOCUMENTS

| | | | |
|---|---|---|---|
| 9,184,792 B2 | 11/2015 | Igarashi et al. | |
| 9,963,042 B2 | 5/2018 | Igarashi et al. | |

(Continued)

FOREIGN PATENT DOCUMENTS

| | | |
|---|---|---|
| DE | 112013001926 T5 | 12/2014 |
| DE | 112014001783 T5 | 12/2015 |

(Continued)

OTHER PUBLICATIONS

Office Action dated May 27, 2019 from German Patent Office for German Patent Application No. 102018114727.9; 7 Pages.

*Primary Examiner* — David V Henze-Gongola

(57) ABSTRACT

A vehicle charging system is disclosed. The vehicle charging system includes a powerline communication module of a vehicle that is configured to transmit a power request signal via a communication network and a powerline communication evaluation module that is configured to determine one or more communication characteristics of the communication network. The vehicle charging system also includes an adjustment module that is configured to reduce a charging rate provided by a charging station based on the one or more communication characteristics.

20 Claims, 4 Drawing Sheets

(51) Int. Cl.
*H02J 7/00* (2006.01)
*H02J 13/00* (2006.01)

(56) References Cited

U.S. PATENT DOCUMENTS

| | | | | |
|---|---|---|---|---|
| 2010/0274697 | A1* | 10/2010 | Zyren | G06Q 30/04 |
| | | | | 705/34 |
| 2013/0119947 | A1* | 5/2013 | Ishida | B60L 3/0046 |
| | | | | 320/162 |
| 2015/0015213 | A1* | 1/2015 | Brooks | H02J 3/24 |
| | | | | 320/137 |
| 2015/0043662 | A1* | 2/2015 | Igarashi | H01M 2/1083 |
| | | | | 375/257 |
| 2016/0075245 | A1* | 3/2016 | Logvinov | B60L 11/1829 |
| | | | | 320/108 |

FOREIGN PATENT DOCUMENTS

| | | |
|---|---|---|
| DE | 102014113240 A1 | 3/2016 |
| EP | 2443721 B1 | 1/2013 |

* cited by examiner

SYSTEM AND METHOD FOR MANAGING CHARGING PARAMETERS BETWEEN A VEHICLE AND A CHARGING STATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle charging systems that monitor communication signals between a charging station and a vehicle connected to the charging station, and more specifically to a system and a method for managing charging parameters between the charging station and the vehicle based upon powerline communication characteristics of the communication signals.

Electric vehicles may be charged at a relatively slow rate from conventional power outlets or at a relatively fast rate from dedicated charging stations. In order to receive power from dedicated charging stations, the electric vehicle is physically connected to charging station and a communication protocol is initiated. Once the communication protocol has been established, power is provided to the electric vehicle for recharging purposes.

SUMMARY

In an example, a vehicle charging system is disclosed. The vehicle charging system includes a powerline communication module of a vehicle that is configured to transmit a power request signal via a communication network and a powerline communication evaluation module that is configured to determine one or more communication characteristics of the communication network. The vehicle charging system also includes an adjustment module that is configured to reduce a charging rate provided by a charging station based on the one or more communication characteristics.

In other features, the adjustment module is further configured to cause adjustment of a communication characteristic of an adjusted power request signal based on the one or more communication characteristics. In other features, the adjustment module is further configured to cause adjustment of the communication characteristic of the adjusted power request signal based on the one or more communication characteristics when the powerline communication evaluation module has determined that an acknowledge signal from a charging station has not been received.

In other features, the adjustment module is further configured to cause adjustment of the communication characteristic of the adjusted power request signal when the one or more communication characteristics exceed a predefined communication link threshold. In other features, the one or more communication characteristics include an amplitude characteristic, a frequency characteristic, or phase shift characteristic. In other features, the adjustment module is further configured to reduce the charging rate provided by the charging station when the one or more communication characteristics exceed a predefined communication link threshold.

In other features, the vehicle charging system includes a power determination module that is configured to determine a state-of-charge of a battery of the vehicle and compare the state-of-charge with a predefined power threshold. The powerline communication module transmits the power request signal to the charging station when the state-of-charge is below the predefined power threshold. In other features, the one or more communication characteristics include a signal-to-noise ratio, a power spectral density, or an error message rate.

In other features, the powerline communication module is configured to encode the power request signal according to a powerline communication protocol. In other features, the adjustment module is further configured to reduce a DC charging rate provided by the charging station based on the one or more communication characteristics.

In an example, a method is disclosed. The method includes transmitting a power request signal via a communication network, determining one or more communication characteristics of the communication network, and reducing a charging rate provided by a charging station to a vehicle based on the one or more communication characteristics.

In other features, the method includes causing adjustment of a communication characteristic of an adjusted power request signal based on the one or more communication characteristics. In other features, the method includes causing adjustment of the communication characteristic of the adjusted power request signal based on the one or more communication characteristics upon determining that an acknowledge signal from a charging station has not been received.

In other features, the method includes causing adjustment of the communication characteristic of the adjusted power request signal when the one or more communication characteristics exceed a predefined communication link threshold. In other features, the communication characteristic includes an amplitude characteristic, a frequency characteristic, or phase shift characteristic.

In other features, the method includes reducing the charging rate provided by the charging station when the one or more communication characteristics exceed a predefined communication link threshold. In other features, the method includes determining a state-of-charge of a battery of the vehicle, comparing the state-of-charge with a predefined power threshold, and transmitting the power request signal to the charging station when the state-of-charge is below the predefined power threshold.

In other features, the communication characteristics include a signal-to-noise ratio, a power spectral density, or an error message rate. In other features, the method includes encoding the power request signal according to a powerline communication protocol. In other features, the method includes reducing a DC charging rate provided by the charging station based on the one or more communication characteristics.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and identical elements.

DETAILED DESCRIPTION

Communication between a vehicle, such as an electric vehicle, and a charging station is established using a power cable that is used to connect the electric vehicle to the charging station in a charging facility. Charging stations and charging station components, such as power cables and/or connectors, have recommended settings in order to establish a powerline communication network between the electric vehicle and the charging station. However, using the power cable to exchange communications between the electric vehicle and the charging station can result in loss of communication due to noise within the system when owners and/or vendors use non-recommended components (i.e., longer power cable, etc.). Once a loss of communication has occurred, charging may be terminated. For instance, once a loss of communication has occurred, current may no longer be provided by the charging station to the electric vehicle.

Typically, the electric vehicle establishes an association with the charging station once physically connected with the charging station through a communication protocol. For instance, the electric vehicle, through a vehicle control module, transmits a current demand request to establish communication with the charging station. Upon receiving the current demand request, the charging station transmits an acknowledgement. This process is continued until the electric vehicle is charged or communication between the electric vehicle and the charging station ceases.

Figure 1:
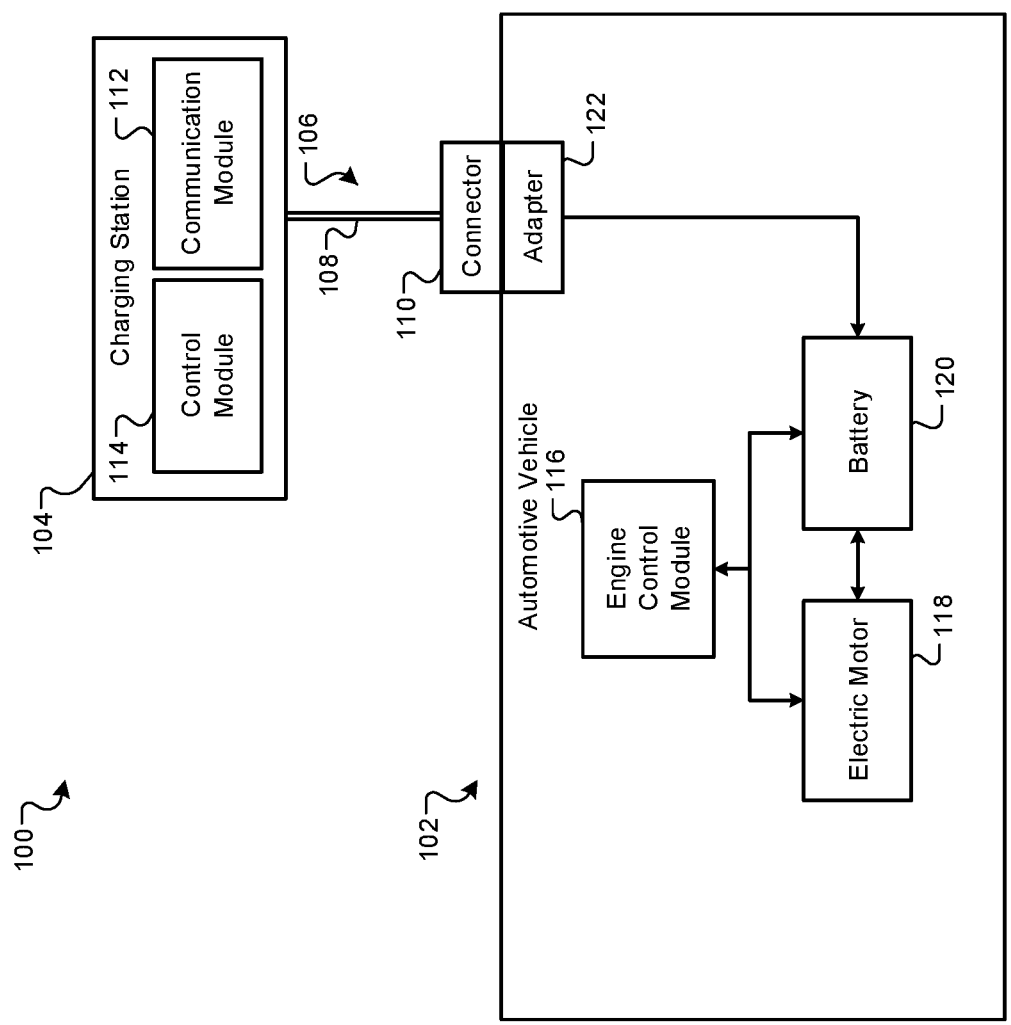
FIG. 1 is a functional block diagram of an example vehicle charging system according to the principles of the present disclosure.

FIG. 1 illustrates an example vehicle charging system 100 in accordance with an example implementation of the present disclosure. As shown, the vehicle charging system 100 includes a vehicle 102 and a charging station 104, also referred to as electric vehicle supply equipment (EVSE). In various implementations, the vehicle 102 includes an electric vehicle or a hybrid vehicle that connects (i.e., interfaces, plugs-in, etc.) with the charging station 104 allowing the charging station 104 to supply electric energy to the vehicle 102 for recharging. In various implementations, the charging station 104 provides direct current (DC) to the vehicle 102 to recharge the vehicle 102. In one or more implementations, a communication network 106 is established once the vehicle 102 is connected to the charging station 104 by way of a power cable 108. In some examples, the communication network 106 includes a wired communication network or a wireless communication network. In implementation, the communication network 106 includes a powerline communications (PLC) network, such as the HomePlug® Green PHY specification. In some instances, the PLC network utilizes the IEEE 1901 powerline communication protocol standard.

As shown, the charging station 104 includes the power cable 108 having a connector 110 to connect with the vehicle 102. The charging station 104 includes a communication module 112 and a control module 114. As described herein, the control module 114 receives requests from a vehicle 102 when the charging station 104 is connected with the vehicle 102. For instance, the communication module 112 receives power request signals encoded according to a powerline communication network protocol by way of the power cable 108. The communication module 112 provides the power request signal to the control module 114, and, in turn, the control module 114 causes the charging station 104 to supply current to the vehicle 102 by way of the power cable 108.

The vehicle 102 includes an engine control module (ECM) 116 that makes control decisions for one or more systems within the vehicle 102. The ECM 116 communicates with an electric motor 118 and/or a battery 120 of the vehicle 102. The electric motor 118 may also function as a generator, and may be used to produce electrical energy for use by vehicle electrical systems and for storage in a battery.

As shown, the electric motor 118 is powered by the battery 120 that stores potential electric energy. The battery 120 is an electric energy storage device that includes a plurality of electrical cells, ultracapacitors, and other devices configured to store electric energy within the vehicle. In one example, the battery 120 includes a plurality of lithium-ion cells. Parameters associated with the battery 120 include a state-of-charge (SOC), temperature, available voltage, and available battery power, each of which is monitored by the ECM 116.

Figure 2:
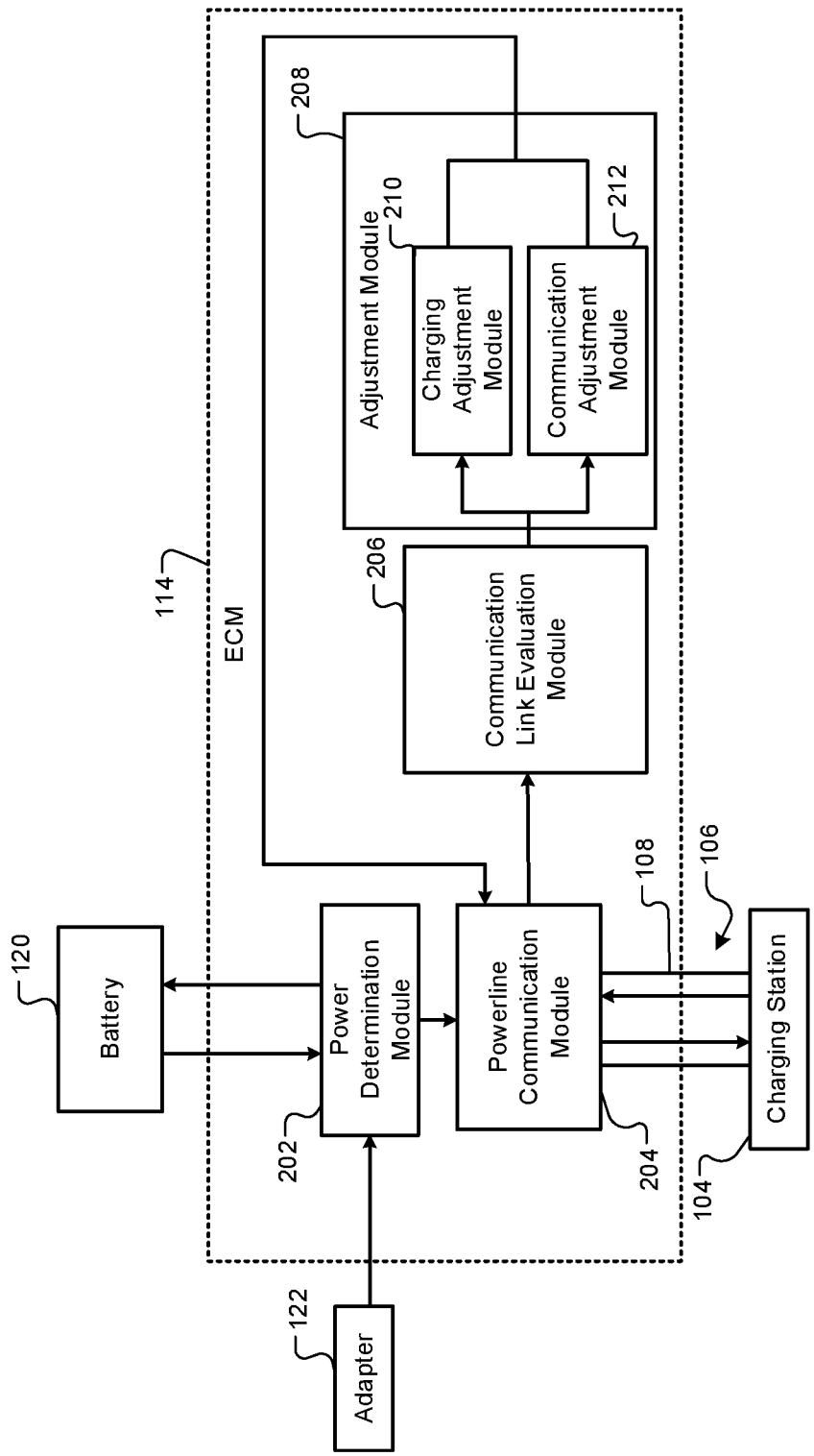
FIG. 2 is a functional block diagram of an example engine control module according to the principles of the present disclosure.

FIG. 2 illustrates an example ECM 116 in accordance with an example implementation of the present disclosure. The ECM 116 includes a power determination module 202, a powerline communication module 204, a communication link evaluation module 206, and an adjustment module 208. In embodiments, the adjustment module 208 includes a charge adjustment module 210 and a communication adjustment module 212.

When the connector 110 of the charging station 104 is connected with an adapter 122 of the vehicle 102, the power determination module 202 determines whether the battery 120 is sufficiently charged. In one example, the power determination module 202 transmits a current power request signal to the battery 120 to obtain the current state of charge of the battery 120 when the power determination module 202 detects that the connector 110 is connected to the adapter 122. In response, the battery 120 provides the current state-of-charge to the power determination module 202.

The power determination module 202 compares a current power to a predefined power threshold to determine whether the power stored in the battery 120 is below the predefined power threshold. If the current power is below the predefined power threshold, the power determination module 202 transmits a power request signal indicative of a request for additional charge to the powerline communication module 204. If the current power is equal to or above the predefined power threshold, the power determination module 202 transmits a sufficient power signal to the powerline communication module 204 indicative of a request to prevent additional charge. The power determination module 202 can compare a current power of one or more systems within the vehicle 102. For example, the power determination module 202 may compare a current power of an infotainment system with a predefined power threshold for the infotainment system. In another example, the power determination module 202 may compare a current power of a power system with a predefined power threshold for the power system, and so forth.

When the powerline communication module 204 receives an indication that the current power is below the predefined threshold, the powerline communication module 204 transmits a power request signal to the charging station 104 for the system that is to be recharged. For instance, the powerline communication module 204 encodes a power request signal according to a powerline communication protocol, which is then transmitted to the charging station 104 via the communication network 106 to establish a communication link. In one example, the power request signal is transmitted to the charging station 104 via the power cable 108.

Upon receiving the power request signal, the control module 114 causes the communication module 112 to transmit an acknowledgement to the powerline communication module 204 via the communication network 106 to establish the communication link. In one example, the acknowledgement is transmitted to the powerline communication module 204 over the power cable 108. In one or more implementations of the present disclosure, the ECM 116 establishes communication with the charging station 104 prior to drawing charge from the charging station 104.

The powerline communication evaluation module 206 determines one or more communication characteristics. In one or more examples, the communication characteristics include communication network characteristics associated with the communication network 106, such as a powerline communication network, or the like. For instance, the powerline communication evaluation module 206 monitors powerline communication characteristics associated with communication signals transmitted between the ECM 116 and the charging station 104. For instance, the powerline communication evaluation module 206 calculates and/or measures a power spectral density, a signal-to-noise (SNR) ratio, an error message rate, a maximum frequency, a minimum frequency, and/or time elapsed since receiving communication from the charging station 104. The communication signals may be any communication signals transmitted between the ECM 116 and the charging station, such as power request signals and/or acknowledgement signals. In examples, the powerline communication module 204 provides powerline communication characteristic signals to the powerline communication evaluation module 206 indicative of whether an acknowledgement was received, how long (i.e., the time period) between transmission of the request and receipt of the acknowledgement, data packet loss, and the like.

In some embodiments, the powerline communication evaluation module 206 measures a transfer function and/or circuit response of the communication network 106. For example, the powerline communication evaluation module 206 measures the transfer function and/or circuit response associated with the power cable 108. The powerline communication evaluation module 206 measures the transfer function and/or circuit response at predetermined frequency intervals to allow the adjustment module 208 to provide an adequate adjustment to one or more charging parameters.

The powerline communication evaluation module 206 may also initially determine one or more powerline communication characteristics upon establishment of a communication network 106 between the vehicle 102 and the charging station 104. For example, once the connector 110 of the charging station 104 is connected with an adapter 122 of the vehicle 102, the powerline communication evaluation module 206 determines one or more powerline communication characteristics of the powerline communication network.

In some instances, the control module 114 causes the communication module 112 to transmit power charger parameters to the ECM 116. The power charger parameters include, but are not necessarily limited to: a length of the power cable 108, a resistance per unit (i.e., feet, inches, meters, etc.) of the power cable 108, a capacitance per unit of the power cable 108, and/or an inductance per unit of the power cable 108. The powerline communication evaluation module 206 can utilize the power charger parameters to evaluate the powerline communication characteristics described above. While connected with the charging station 104, the powerline communication evaluation module 206 monitors (i.e., measures and/or calculates) the various powerline communication characteristics and provides the powerline communication characteristics to the charging adjustment module 210 and/or the communication adjustment module 212.

The charging adjustment module 210 determines whether to adjust one or more charging parameters (i.e., adjust the charging rate) based upon the monitored powerline communication characteristics. The charging adjustment module 210 receives, as input, powerline communication characteristic signals indicative of the powerline communication characteristics measured and/or calculated by the communication link evaluation module 206. The charging adjustment module 210 compares the powerline communication characteristics with a predefined communication link threshold that is indicative of a potential loss-of-communication. For instance, the charging adjustment module 210 compares the signal-to-noise ratio corresponding to the communication signals with a predefined signal-to-noise error threshold.

The charging adjustment module 210 adjusts a charging parameter when the powerline communication characteristic exceeds the predefined communication link threshold. In one example, the charging adjustment module 210 transmits a charging adjustment signal to the powerline communication module 204 when the predefined communication link threshold is exceeded. In another example, the charging adjustment module 210 and/or communication adjustment module 212 generates an adjustment signal to adjust the charging rate and/or communication characteristic of a power request signal. For instance, the charging adjustment module 210 can adjust the charging rate and/or communication characteristic of a power request signal based upon the length of the power cable 108, a resistance per unit (i.e., feet, inches, meters, etc.) of the power cable 108, a capacitance per unit of the power cable 108, initially measured powerline communication characteristics, and/or an inductance per unit of the power cable 108.

The powerline communication module 204 encodes the charging adjustment signal according to a powerline communication protocol and transmits the encoded charging adjustment signal to the charging station 104. In response to receiving the encoded charging adjustment signal, the charging station 104, via the control module 114, adjusts a charging parameter. In one or more implementations, the charging parameter represents the energy rate, or amperage provided per time unit, provided to the vehicle 102 from the charging station 104. For instance, the control module 114 causes the charging station 104 to decrease an amount of energy provided to the vehicle 102 per time increment (i.e., modification of an energy rate). In implementations, the energy rate modification is proportional to a magnitude of the signal-to-noise (SNR) ratio, an error message rate, a maximum frequency, a minimum frequency, and the like.

In an implementation, the charging station 104 adjusts the charging rate (i.e., amount of current magnitude provided per time unit, amperage provided per time unit) provided from the charging station 104 to the vehicle 102 based upon the charging adjustment signal provided by the ECM 114. In one example, the charging station 104 dynamically adjusts the charging rate at fixed value (i.e., ampere) increments (i.e., reduces the amperage of the current per defined time increment (i.e., time unit) by one milliamp (1 mA), one microamp (1 µA), etc.). In another example, the charging station 104 adjusts the charging rate at variable value increments. For instance, the charging station 104 receives charging adjustment signals from the powerline communication module 204 and variably adjusts the amperage based upon the powerline communication characteristic. In this example, the charging adjustment signals are encoded with the powerline communication characteristic, and the charging station 104 varies the amperage according to the powerline communication characteristic.

The powerline communication module 204 detects the change in the amperage (i.e., charging rate) provided to the vehicle 102 and provides an adjusted signal to the communication link evaluation module 206. In response, the powerline communication evaluation module 206 calculates and/or measures the powerline communication characteristics based upon change in amperage. The re-calculated and/or re-measured powerline communication characteristics are provided to the charging adjustment module 210. In response, the charging adjustment module 210 compares the amperage per time unit provided to the vehicle 102 is less than a predefined performance threshold. For instance, the predefined performance threshold is indicative of an amount amperage provided per time unit (i.e., amperage provided from the charging station 104) used to charge the vehicle 102 within a defined amount of time. If the amperage provided per time unit is less than the predefined performance threshold, the charging adjustment module 210 determines that an increase in amperage per time unit is to be initiated to meet the charging requirements of the vehicle 102. The charging adjustment module 210 generates a request to increase the amperage provided per time unit, and the powerline communication module 204 encodes and transmits the request to the charging station 104. In turn, the charging station 104 increases the amperage provided per unit time to the vehicle 102 by a defined increment.

In other implementations, the communication adjustment module 212 causes the powerline communication module 204 to adjust one or more characteristics of the power request signal. For instance, when the powerline communication characteristics exceed a predefined communication link threshold, the communication adjustment module 212 generates a communication characteristic adjustment signal that causes the powerline communication module 204 to modulate a communication characteristic of the power request signal. For instance, the communication adjustment module 212 causes the powerline communication module 204 to modulate at least one of an amplitude characteristic, a frequency characteristic, or a phase shift characteristic of the power request signal. The powerline communication evaluation module 206 provides the re-calculated and/or re-measured powerline communication characteristics to the communication adjustment module 212. Based upon the re-calculated and/or re-measured powerline communication characteristics, the communication adjustment module 212 can further causes the powerline communication module 204 to modulate the frequency of the power request signal as discussed in greater detail below.

Figure 3:
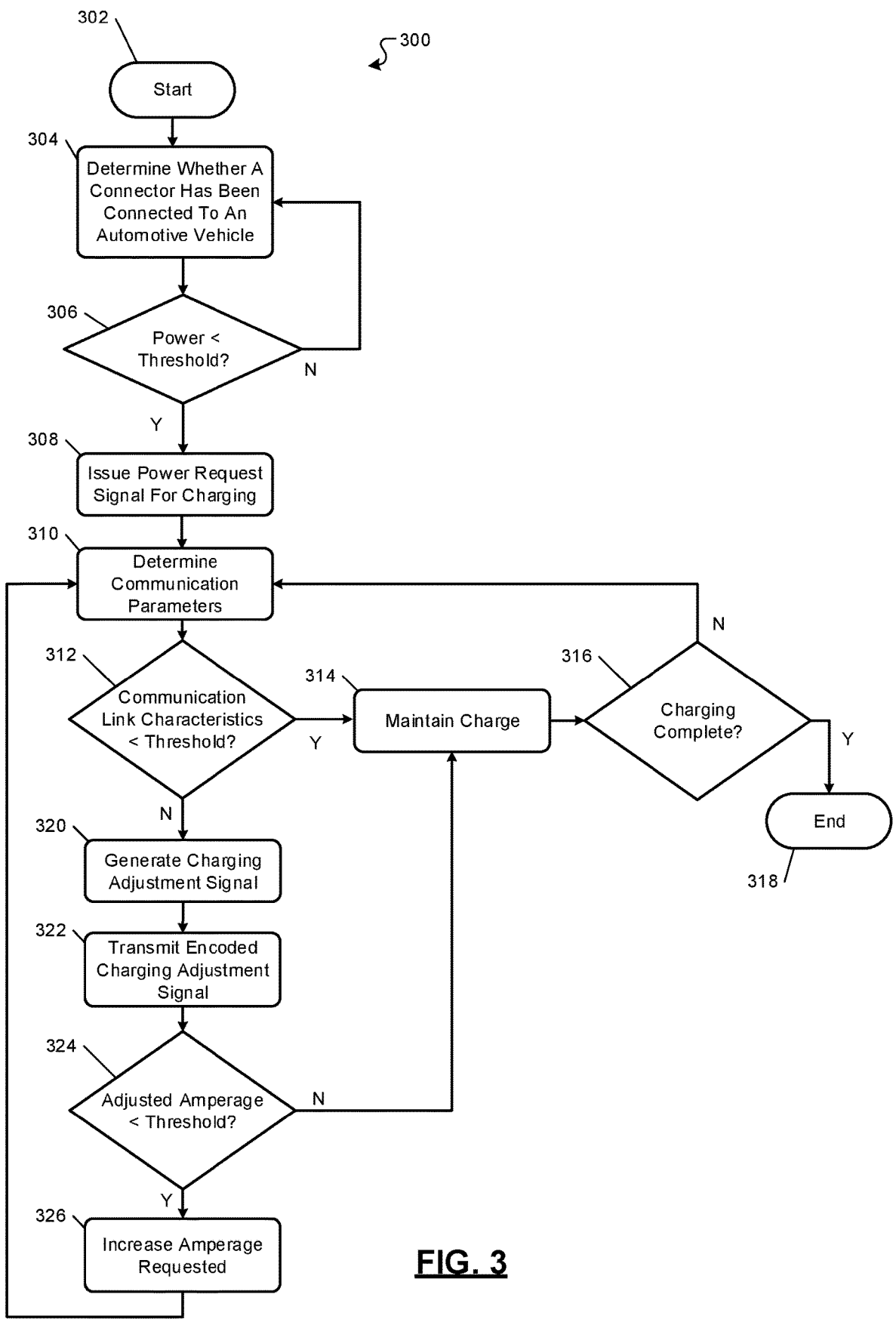
FIG. 3 is a flowchart illustrating an example method for adjusting an amperage of a current provided by a charging station based on powerline communication characteristics according to the principles of the present disclosure.

FIG. 3 illustrates an example method 300 for adjusting a magnitude of a current provided to a vehicle 102 from an electric charger 104. The method is described in the context of the modules included in the example implementation of the ECM 116 shown in FIG. 2. However, the particular modules that perform the steps of the method may be different than those mentioned below and/or the method may be implemented apart from the modules of FIG. 2. The method 300 begins at 302.

The method begins at 302. At 304, the power determination module 202 determines that a connector 110 has been connected to the vehicle 102. At 306, the power determination module 202 determines whether the current power is below the predefined power threshold. For example, the power determination module 202 compares a current power of a battery, an infotainment system, a power system, or the like, with a respective predefined power threshold. If the current power is not below the predefined power threshold, the method 300 transitions to 304. If the current power is below the predefined power threshold, the power determination module 202 transmits a power request signal indicative of the request for additional charge to the powerline communication module 204 at 308. The powerline communication module 204 encodes a power request signal according to a powerline communication protocol. At 310, the powerline communication evaluation module 206 determines (i.e., calculates, measures) powerline communication characteristics associated with the communication signals between the ECM 116 and the charging station 104 based upon the amperage provided per time unit.

At 312, the charging adjustment module 210 determines whether the powerline communication characteristics exceed the predefined communication link threshold. If the communications parameters do not exceed the predefined communication link threshold, the amperage provided per unit time is maintained at 314. At 316, the power determination module 202 determines whether charging has completed. If charging of the vehicle 102 is completed, the method 300 ends at 318. If charging has not completed, the method 300 transitions to 310.

At 320, the charging adjustment module 210 transmits a charging adjustment signal to adjust a charge generated by the charging station 104 when the powerline communication characteristics exceed the predefined communication link threshold. At 322, the powerline communication module 204 transmits an encoded charging adjustment signal to the charging station 104 upon receipt of the charging adjustment signal from the charging adjustment module 210.

At 324, the charging adjustment module 210 determines whether the amperage per time unit is less than a predefined performance threshold. At 326, the charging adjustment module 210 determines that an increase in amperage per time unit is to be initiated to when the amperage per unit time is less than the predefined threshold. The method 300 then transitions to 310. If the charging adjustment module 210 determines that the amperage per time unit is not less than a predefined performance threshold, the method transitions to 314.

Figure 4:
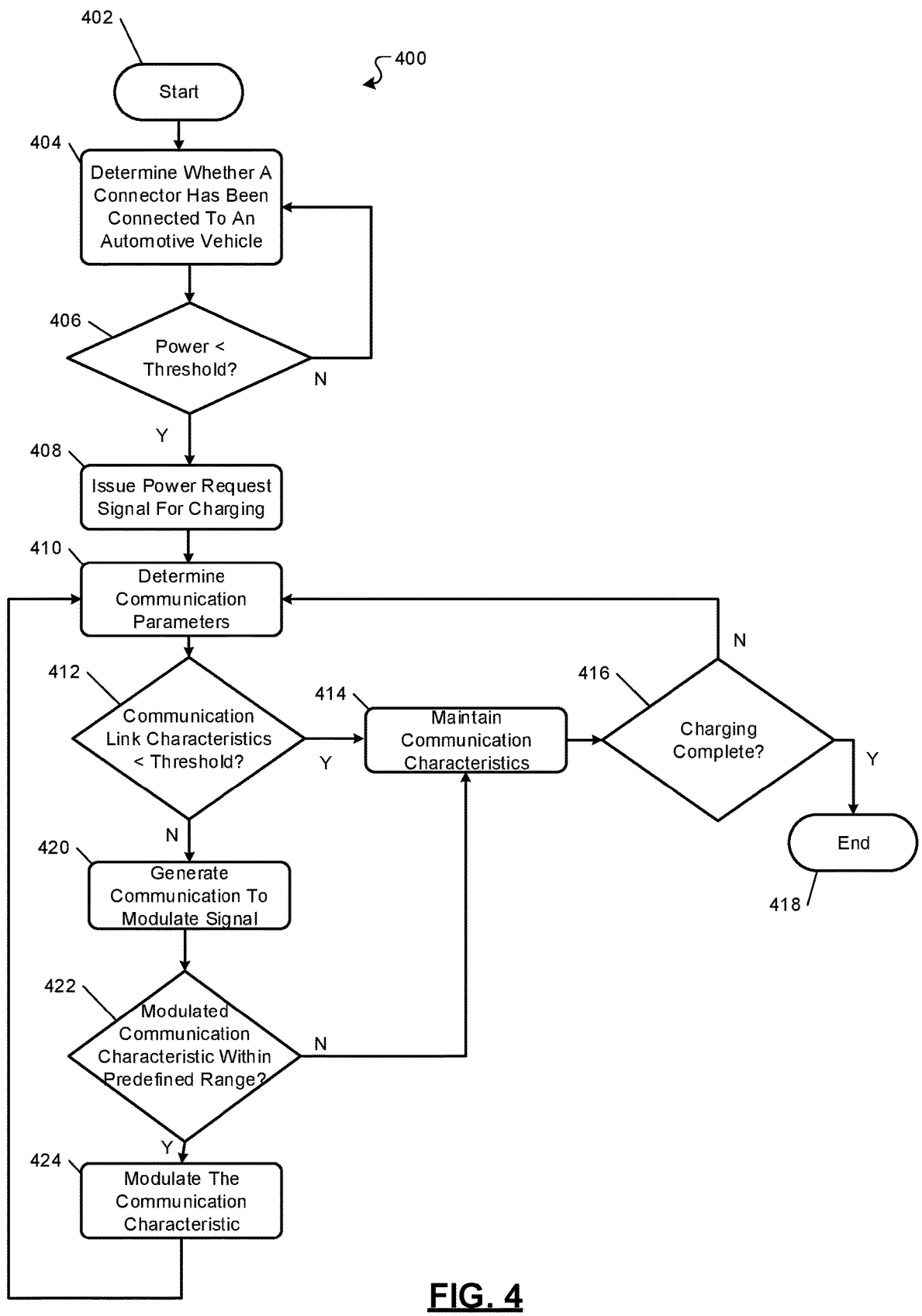
FIG. 4 is a flowchart illustrating an example method for modulating a communication characteristic of a power request signal based on powerline communication characteristics according to the principles of the present disclosure.

FIG. 4 illustrates an example method 400 for adjusting a communication characteristic of a power request signal transmitted from the powerline communication module 204 to the charging station 104. The method is described in the context of the modules included in the example implementation of the ECM 116 shown in FIG. 2. However, the particular modules that perform the steps of the method may be different than those mentioned below and/or the method may be implemented apart from the modules of FIG. 2. The method 400 begins at 402.

At 404, the power determination module 202 determines that a power connector 110 has been connected to the vehicle 102. At 406, the power determination module 202 determines whether the power stored within the vehicle 102 is below a predefined power threshold. If the current power is not below the predefined power threshold, the method 400 transitions to 404. If the current power is below the predefined power threshold, the power determination module 202 transmits a power request signal indicative of the request for additional charge to the powerline communication module 204 at 408. At 412, the powerline communication evaluation module 206 determines powerline communication characteristics associated with the communication signals between the ECM 116 and the charging station 104 based upon the amperage provided per time unit.

At 412, the communication adjustment module 212 determines whether the powerline communication characteristics exceed the predefined communication link threshold. If the communications parameter does not exceed the predefined communication link threshold, the communication characteristics of the power request signals are not modulated at 414. At 416, the power determination module 202 determines whether charging has completed. If charging of the vehicle 102 is completed, the method 400 ends at 418. If charging has not completed, the method 400 transitions to 420. At 420, the communication adjustment module 212 transmits a communication adjustment signal (i.e., communication modulation signal) to modulate a characteristic of the power request signal when the powerline communication characteristics exceed the predefined communication link threshold.

At 422, the communication adjustment module 212 determines whether a modulated communication characteristic of the power request signal is within a predefined range of communication characteristics. The predefined range of communication characteristics is calculated by the communication adjustment module 212 based upon the power charger parameters and/or the amperage provided per time unit. For example, the charging adjustment module 210 determines whether a modulated amplitude characteristic of the power request signal is within a defined range of amplitude values. In another example, the communication adjustment module 212 determines whether a modulated frequency characteristic of the power request signal is within a defined range of frequency values. In yet another example, the communication adjustment module 212 determines whether a modulated phase shift characteristic of the power request signal is within a defined range of phase shift values.

At 424, the powerline communication module 204 modulates the communication characteristic of the power request signal to a communication characteristic within the predefined range of communication characteristics when the modulated communication characteristic is not within the defined range of corresponding characteristics based upon the one or more characteristics described above. The method 400 transitions to 410. When the modulated communication characteristic is within the defined range of corresponding communication characteristics, the method 400 transitions to 414.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and microcode, and may refer to programs, routines, functions, classes, data structures, and objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle charging system comprising:
   a powerline communication module of a vehicle that is configured to transmit a power request signal via a communication network;
   a powerline communication evaluation module that is configured to determine one or more communication characteristics of the communication network,
   wherein the one or more communication characteristics comprise a power spectral density; and
   an adjustment module that is configured to reduce a charging rate provided by a charging station based on the one or more communication characteristics.

2. The vehicle charging system as recited in claim 1 wherein the adjustment module is further configured to cause adjustment of at least one communication characteristic of the power request signal based on the one or more communication characteristics of the communication network.

3. The vehicle charging system as recited in claim 2 wherein the adjustment module is further configured to cause adjustment of the at least one communication characteristic of the power request signal based on the one or more communication characteristics of the communication network when the powerline communication evaluation module has determined that an acknowledge signal from a charging station has not been received.

4. The vehicle charging system as recited in claim 2 wherein the adjustment module is further configured to cause adjustment of the at least one communication characteristic of the power request signal when the one or more communication characteristics of the communication network exceed a predefined communication link threshold.

5. The vehicle charging system as recited in claim 2 wherein the at least one communication characteristic of the power request signal comprises at least one of an amplitude characteristic, a frequency characteristic, and phase shift characteristic.

6. The vehicle charging system as recited in claim 1 wherein the adjustment module is further configured to reduce the charging rate provided by the charging station when the one or more communication characteristics exceed a predefined communication link threshold.

7. The vehicle charging system as recited in claim 1, further comprising a power determination module that is configured to determine a state-of-charge of a battery of the vehicle and compare the state-of-charge with a predefined power threshold, wherein the powerline communication module transmits the power request signal to the charging station when the state-of-charge is below the predefined power threshold.

8. The vehicle charging system as recited as recited in claim 1 wherein the powerline communication module is configured to encode the power request signal according to a powerline communication protocol.

9. The vehicle charging system as recited in claim 1 wherein the adjustment module is further configured to reduce a DC charging rate provided by the charging station based on the one or more communication characteristics.

10. The vehicle charging system as recited in claim 1 wherein the one or more communication characteristics of the communication network further comprise a signal to noise ratio.

11. A method, comprising:
transmitting a power request signal via a communication network;
determining one or more communication characteristics of the communication network,
wherein the one or more communication characteristics comprise a power spectral density; and
reducing a charging rate provided by a charging station to a vehicle based on the one or more communication characteristics.

12. The method as recited in claim 11, further comprising: causing adjustment of at least one communication characteristic of the power request signal based on the one or more communication characteristics of the communication network.

13. The method as recited in claim 12, further comprising: causing adjustment of the at least one communication characteristic of the power request signal based on the one or more communication characteristics of the communication network upon determining that an acknowledge signal from a charging station has not been received.

14. The method as recited in claim 12, further comprising: causing adjustment of the at least one communication characteristic of the power request signal when the one or more communication characteristics of the communication network exceed a predefined communication link threshold.

15. The method as recited in claim 12, wherein the at least one communication characteristic of the power request signal comprises at least one of an amplitude characteristic, a frequency characteristic, and phase shift characteristic.

16. The method as recited in claim 11, further comprising: reducing the charging rate provided by the charging station when the one or more communication characteristics exceed a predefined communication link threshold.

17. The method as recited in claim 11, further comprising determining a state-of-charge of a battery of the vehicle; comparing the state-of-charge with a predefined power threshold; and transmitting the power request signal to the charging station when the state-of-charge is below the predefined power threshold.

18. The method as recited as recited in claim 11, further comprising: encoding the power request signal according to a powerline communication protocol.

19. The method as recited in claim 11, further comprising reducing a DC charging rate provided by the charging station based on the one or more communication characteristics.

20. The method as recited in claim 11 wherein the one or more communication characteristics of the communication network further comprise a signal to noise ratio.

* * * * *